United States Patent

[11] 3,621,329

| | | | | |
|---|---|---|---|---|
| [72] | Inventor | Egon Frey<br>Stuttgart-Degerloch, Germany | | |
| [21] | Appl. No. | 783,188 | | |
| [22] | Filed | Dec. 12, 1968 | | |
| [45] | Patented | Nov. 16, 1971 | | |
| [73] | Assignee | Daimler-Benz Aktiengesellschaft<br>Stuttgart-Unterturkheim, Germany | | |
| [32] | Priority | Dec. 12, 1967 | | |
| [33] | | Germany | | |
| [31] | | P 16 30 398.3 | | |

[54] PARKING LIGHT SYSTEM FOR MOTOR VEHICLES
4 Claims, 3 Drawing Figs.

[52] U.S. Cl. .................................................. 315/77, 315/83
[51] Int. Cl. .................................................. B60q 1/48
[50] Field of Search .......................................... 315/77, 82, 83; 340/76

[56] References Cited
UNITED STATES PATENTS

| | | | |
|---|---|---|---|
| 3,456,153 | 7/1969 | Smith ........................... | 315/83 X |
| 3,040,207 | 6/1962 | Grontkowski ................ | 317/77 |

FOREIGN PATENTS

| | | | |
|---|---|---|---|
| 1,016,778 | 1/1966 | Great Britain ................ | 315/82 |

Primary Examiner—Roy Lake
Assistant Examiner—E. R. LaRoche
Attorney—Craig & Antonelli ABSTRACT: A parking light system for motor vehicles employs individual lamp elements which serve as both parking lights and as the vehicle boundary and taillights. To selectively energize the lights on one side of the vehicle, while preventing the energization of lights on the opposite side of the vehicle, a diode arrangement is connected between the light power system and the light-actuating switch.

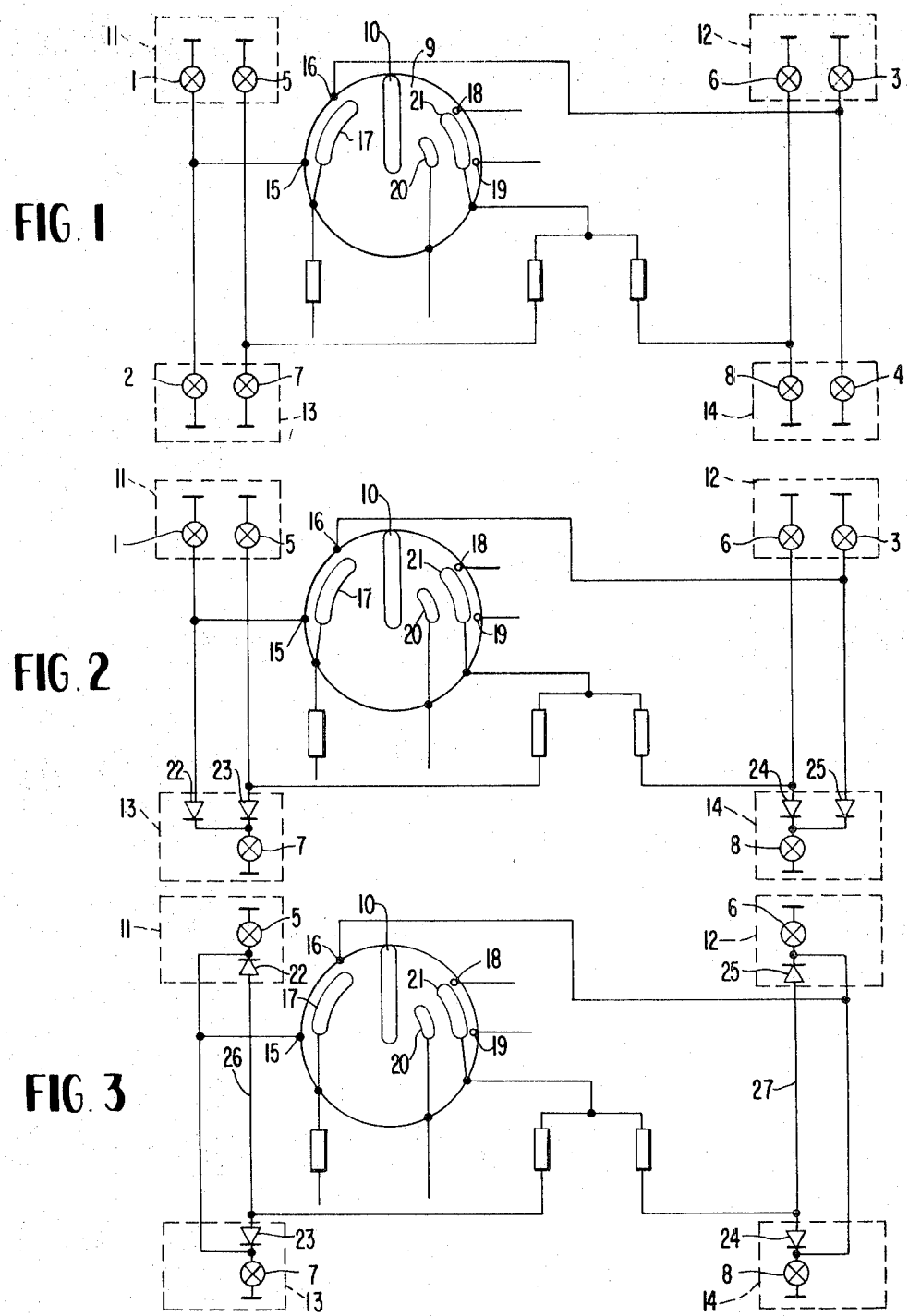

PARKING LIGHT SYSTEM FOR MOTOR VEHICLES

The present invention relates to a parking light system for motor vehicles in which, depending on the parked direction of the vehicle, the side of the motor vehicle facing the traffic is made recognizable by energization of a lamp in the associated front and rear light.

Vehicles are already known in the prior art which are equipped with a parking light system whereby the respective lights at the front end and at the rear end of the motor vehicle include additional lamps for the parking light system.

For the purpose of increasing the external safety, the amount of illumination provided by the tail lamp and of the direction indicator has been increased. Difficulties result therefrom for the accommodation of the parking lamps, particularly in the rear lights, because an increase in the external dimensions of these, i.e., the light assemblies is generally not desired.

With the present invention it is possible to provide direction indicators parking lights and their associated wiring, within a rear light of original size while still providing a tail light which illuminates a large area, and yet, in the process, uses as few lamps as possible.

Consequently, a parking light system for motor vehicles in which, depending on parked direction, the side of the motor vehicle facing the traffic is made recognizable by illumination of a lamp accommodated in the associated front or rear light assembly, is proposed in which according to the present invention a diode blocking circuit is provided which prevents a simultaneous energization of the lamps not belonging to the turned-on parking light system, so that both the tail or rear lamps, as well as the lamps of the forward boundary or standing light, can be selectively utilized for the parking and motor vehicle lights.

A simple circuit design is achieved if two diodes are accommodated in each rear light assembly, whereby one set of diodes prevents the concurrent or simultaneous energization of the remaining vehicle lights, with a circuit connection with the parking light and the other set of diodes prevents the concurrent or simultaneous illumination of the forward parking light lamps during the turning-on of the vehicle light system.

In one preferred embodiment of the present invention, the lights of the boundary or standing light lamp and also the rear lights include each one diode, by means of which one line section becomes deenergized with a circuit connection as parking light.

The light yield or efficiency of the lamps is decreased thereby only insignificantly if diodes with a slight voltage drop are used.

Accordingly, it is an object of the present invention to provide a parking light system for motor vehicles which eliminates the aforementioned shortcomings and drawbacks encountered in the prior art.

Another object of the present invention resides in a parking light system for motor vehicles which is simple in construction and offers no difficulties as regards accommodation of the various components in a light assembly or cluster.

A further object of the present invention resides in a parking light system for motor vehicles which permits an increase in the external safety of the motor vehicle by increasing the lighting surfaces without entailing difficulties with respect to accommodation and assembly.

A still further object of the present invention resides in a parking light system for motor vehicles which minimizes the number of lamps necessary in the vehicle without sacrificing to any great extent the efficiency of the system.

These and other objects, features and advantages of the present invention will become more obvious from the following description when taken in connection with the accompanying drawing which shows, for purposes of illustration only, two embodiments in accordance with the present invention, and wherein.

FIG. 1 is a schematic wiring diagram of a prior art circuit with one lamp each for the parking and the boundary or standing light and one lamp each for the parking and the taillight;

FIG. 2 is a schematic wiring diagram of a circuit according to the present invention in which two diodes are arranged in each rear light and a common lamp is provided for the tail and parking light, and FIG. 3 is a schematic wiring diagram of a modified embodiment of a circuit in accordance with the present invention in which, by reason of the diode arrangement, the taillight lamp and also the boundary or standing light lamp are used for the parking light system.

Referring now to the drawing wherein like reference numerals are used throughout the various views to designate like parts, in the known, prior art parking light circuit according to FIG. 1, the parking light lamps 1,2,3,4, and also the boundary or limit light lamps 5 and 6 and the taillight lamps 7 and 8 are turned on by a conventional rotary light switch 9 having a movable contact bridge 10. The respective pairs of lamps are surrounded by a common housing indicated in dashed lines, i.e., by the head lights 11 and 12 and by the taillights 13 and 14. By pivoting the contact bridge or wiper 10 to the contact 15 or 16 the contact segment 17 is selectively connected with the contact 15 or 16 which leads to an illumination of the left or of the right parking light. If the contact bridge is pivoted to one of the contacts 18 or 19, then the contact segment 20 is connected with the concentric contact segment 21. As a result thereof, the boundary or limit light lamps 5 and 6 as well as the taillight lamps 7 and 8 are energized.

In FIG. 2 there is shown a circuit in which the taillight lamps 7 and 8 are utilized for the parking light system in conjunction with four diodes 22,23,24 and 25. The operation is thereby as follows:

If the contact bridge 10 is pivoted to the contact 15, then the forward parking light lamp 1 and the taillight lamp 7 serving as rear parking light lamp are energized and light up because a connection of the contact 15 is established with the contact segment 17. An energization and illumination of the boundary light lamp 5 and also of the remaining lamps, arranged on the right-hand side, is avoided because the diode 23 acts as blocking means. If the right parking light system is turned on by pivoting the contact bridge 10 to the contact 16, then the diode 24 prevents a simultaneous energization and illumination of the lamps arranged on the left-hand side. With the turning on of the vehicle lights, which takes place by a pivoting of the contact bridge 10 to one of the two contacts 18 or 19, the contact segment 20 is also connected with the contact segment 21. Consequently, an energization and illumination of the forward boundary lamps 5 and 6 and of the taillight lamps 7 and 8 occurs whereas the parking light lamps 1 and 3 are prevented from an energization and light up by the blocking action of the diodes 22 and 25.

FIG. 3 shows a circuit in which both the forward boundary or limit light lamps 5 and 6 as also the taillight lamps 7 and 8 serve for the parking light system. With the pivoting of the contact bridge 10 to the contact 15, a connection of the contact segment 17 is established with the contact 15, whereby the forward boundary light lamp 5 and the taillight lamp 7 are illuminated. This corresponds to the parking light circuit connection for one vehicle side because the lamps arranged on the right-hand side are not energized and thus not illuminated because line section 26 is deenergized as a result of the blocking effect of the diodes 23 and 22.

If the contact bridge 10 comes into engagement with the contact 16, then the parking light lamps arranged on the right-hand side are energized and light up whereas the parking light lamps arranged on the left-hand side can not light up by reason of the diodes 24 and 25 acting as blocking means, and of the then deenergized condition of the line section 27 connected therewith.

The blocking effect of the diodes 22,23,24, and 25 is eliminated when vehicle light system is turned on by the pivoting of contact bridge 10 to one of the contacts 18 and 19 and by the connection of the two contact segments 20 and 21 resulting therefrom.

While I have shown and described only two embodiments in accordance with the present invention it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A parking light system for a motor vehicle comprising:
front and rear lights provided on each side of said motor vehicle, each of said front lights including a parking lamp and each of said rear lights being a parking lamp;
a source of energy for said lights; and
means for continuously energizing the parking lamps on one side of said vehicle while preventing the energization of the parking lamps on the side of said vehicle opposite said one side, said energizing and preventing means comprising a first diode connected between each of said rear parking lamps and the front parking lamp on the same respective side of said vehicle, means for selectively connecting the source of energy to said front and rear parking lamps on either one side of the vehicle or the other, said front lights further including a boundary lamp connectable with said energy source, and wherein said energizing and preventing means further comprises an additional diode connected between each of said rear parking lamps and said boundary lamp on the same respective side of said vehicle and further including means for selectively connecting said energy source to each of said forward boundary lamps and said rear parking lamps simultaneously.

2. A parking light system according to claim 1, wherein said selectively connecting means comprises a switch having a first plurality of terminals each connected to said energy source, and also having a second plurality of terminals, wherein a first terminal of said second plurality of terminals is connected to one of said forward parking lamps and one of said first diodes, a second terminal of said second plurality is connected to the other of said forward parking lamps and the other of said first diodes and a third of said second plurality of terminals is connected to each of said additional diodes, and further including a wiper for connecting the respective terminals connected to said energy source with each of said respective second plurality of terminals.

3. A parking light system for a motor vehicle comprising:
front and rear lights provided on each side of said motor vehicle, each of said front lights including a parking lamp and each of said rear lights being a parking lamp;
a source of energy for said lights; and
means for continuously energizing the parking lamps on one side of said vehicle while preventing the energization of the parking lamps on the side of said vehicle opposite to one side, said energizing and preventing means comprising a first diode connected to each of said rear parking lamps, wherein each of said forward light is both a parking lamp and a boundary lamp and wherein said energizing and preventing means further includes an additional diode connected to each of said forward lamps between said forward lamp and said first diode, and further including means for selectively connecting said energy source to both of said forward lamps and rear lamps on either side of said vehicle, and wherein said selectively connecting means further includes means for selectively connecting said energy source to each of said lamps simultaneously.

4. A parking light system according to claim 3, wherein said selectively connecting means comprises a switch having a first plurality of terminals, each connected to said energy source, and also having a second plurality of terminals, wherein a first terminal of second plurality of terminals is connected to each of said lamps on one of said sides, a second terminal of said second plurality is connected to each of said lamps on the other of said sides, and a third terminal of said second plurality of terminals is connected to each of said additional diodes, and further including a wiper for connecting the respective terminals connected to said energy source with each of said respective second plurality of terminals.

* * * * *